(12) United States Patent
Stella et al.

(10) Patent No.: US 10,310,828 B2
(45) Date of Patent: Jun. 4, 2019

(54) SYSTEM AND METHOD FOR PROVIDING AND EXECUTING A DOMAIN-SPECIFIC LANGUAGE FOR CLOUD SERVICES INFRASTRUCTURE

(71) Applicant: Fugue, Inc., Frederick, MD (US)

(72) Inventors: Josha Stella, Shepherdstown, WV (US); Dominic Zippilli, Frederick, MD (US); Alex Schoof, Herndon, VA (US); Jared Tobin, Auckland (NZ); Jasper Van Der Jeugt, Zurich (CH); Maciej Wos, Hong Kong (CN); Christopher Kaminski, Philadelphia, PA (US); Tyler Drombosky, Washington, DC (US); Timothy Wilson, Gainesville, VA (US); Jonathan Sabo, Ashburn, VA (US)

(73) Assignee: Fugue, Inc., Frederick, MD (US)

( * ) Notice: Subject to any disclaimer, the term of this patent is extended or adjusted under 35 U.S.C. 154(b) by 0 days.

(21) Appl. No.: 14/941,345

(22) Filed: Nov. 13, 2015

(65) Prior Publication Data

US 2016/0139895 A1 May 19, 2016

Related U.S. Application Data

(60) Provisional application No. 62/079,403, filed on Nov. 13, 2014.

(51) Int. Cl.
*G06F 9/44* (2018.01)
*G06F 8/41* (2018.01)
(Continued)

(52) U.S. Cl.
CPC .................. *G06F 8/44* (2013.01); *G06F 8/35* (2013.01); *G06F 9/45512* (2013.01);
(Continued)

(58) Field of Classification Search
CPC ..... G06F 9/4856; G06F 9/5072; H04L 67/10; H04L 67/1002
See application file for complete search history.

(56) References Cited

U.S. PATENT DOCUMENTS 8,578,348 B2 * 11/2013 Fliess ........................ G06F 8/70
717/135
8,638,674 B2 1/2014 Nugent
(Continued)

FOREIGN PATENT DOCUMENTS

WO 2017/034527 A1 3/2017

OTHER PUBLICATIONS

Amazon, "Welcome—Amazon Elastic Computer Cloud", Dec. 19, 2013, p. 1.*
(Continued)

*Primary Examiner* — Duy Khuong T Nguyen
(74) *Attorney, Agent, or Firm* — Morrison & Foerster LLP

(57) ABSTRACT

A system and method for providing and executing a domain-specific programming language for cloud services infrastructure is provided. The system may be used to integrate references to external entities, such as cloud service compute instances, directly into a domain-specific programming language, allowing developers to easily integrate cloud services directly using the domain-specific programming language. Using a domain-specific programming language, references to external entities (not in memory) as variables may be used. Using the domain-specific programming language described herein, lexical scoping may be mapped onto collections of entities that aren't a native part of the language. In order to facilitate these and other benefits, the system may maintain state information of all references and shared variables across program boundaries. The system may make the state information accessible via a state
(Continued)

information service that understands the language features of the domain-specific programming language.

14 Claims, 6 Drawing Sheets

(51) Int. Cl.
  *H04L 29/08* (2006.01)
  *G06F 8/35* (2018.01)
  *G06F 9/455* (2018.01)
  *G06F 8/30* (2018.01)

(52) U.S. Cl.
  CPC ............... *H04L 67/10* (2013.01); *G06F 8/31* (2013.01); *G06F 8/41* (2013.01)

(56) References Cited

U.S. PATENT DOCUMENTS

| | | | |
|---|---|---|---|
| 9,106,584 B2 | 8/2015 | Mao et al. | |
| 9,838,376 B1 | 12/2017 | Lander et al. | |
| 9,843,624 B1 | 12/2017 | Taaghol et al. | |
| 2003/1005619 | 3/2003 | Burgess | |
| 2012/0150939 A1 | 6/2012 | Zaifman et al. | |
| 2013/0152047 A1* | 6/2013 | Moorthi | G06F 11/368 717/124 |
| 2013/0275958 A1* | 10/2013 | Ivanov | G06F 8/61 717/174 |
| 2014/0013315 A1* | 1/2014 | Genevski | G06F 8/60 717/170 |
| 2014/0068340 A1* | 3/2014 | Dayal | G06F 11/3672 714/38.1 |
| 2014/0100912 A1 | 4/2014 | Bursey | |
| 2014/0101631 A1 | 4/2014 | Hughes | |
| 2014/0258513 A1* | 9/2014 | Letca | G06F 21/6218 709/224 |
| 2015/0378700 A1 | 12/2015 | Rachamadugu et al. | |
| 2016/0094483 A1* | 3/2016 | Johnston | H04L 47/827 709/226 |
| 2016/0139895 A1 | 5/2016 | Stella et al. | |
| 2016/0142253 A1 | 5/2016 | Steinder et al. | |
| 2016/0300142 A1 | 10/2016 | Feller et al. | |
| 2017/0302531 A1 | 10/2017 | Maes | |
| 2018/0246738 A1* | 8/2018 | McCourtney | G06F 8/437 |

OTHER PUBLICATIONS

Tao, "Combining Cloud and Grid with a User Interface", Dec. 11, 2009, pp. 1-17.*
International Search Report and Written Opinion dated Feb. 2, 2016, directed to International Application No. PCT/US2015/060728; 8 pages.
Extended Search Report dated Jun. 21, 2018, directed to EP Application No. 15858485.4; 7 pages.
Thiery, A. et al., "A DSL for deployment and testing in the Cloud", 2014 IEEE International Conference on Software Testing, Verification, and Validation Workshops, Mar. 31, 2014, pp. 376-382.
Anderson. (Nov. 6, 2015) "Chef launches Compliance: Server security policy as code" located at https://www.theregister.co.uk/2015/11/06/chef_launches_compliance_policy_as_code/visited May 16, 2018. (3 pages).
International Search Report and Written Opinion dated Jan. 2, 2019, directed to PCT Application No. PCT/US2018/052082; 16 pages.
International Search Report and Written Opinion dated May 25, 2018, directed to PCT Application No. PCT/US2018/017684; 14 pages.
Kramer, M. "Controlling the Processing of Smart City Data in the Cloud with Domain-Specific Languages," 2014 IEEE/ACM 7th International Conference on Utility and Cloud Computing, Dec. 8-11, 2014, Washington, D.C.; pp. 824-829.
McCourtney et al., U.S. Office Action dated Jun. 25, 2018, directed to U.S. Appl. No. 15/893,215; 13 pages.
Stella et al. (Oct. 11, 2016). "Why We Built Ludwig—a DSL for the Cloud of Today and the Future" located at https://blog.fugue.co/2016-10-11-why-we-builty-ludwig.html visited Jun. 27, 2018 (10 pages).

* cited by examiner

SYSTEM AND METHOD FOR PROVIDING AND EXECUTING A DOMAIN-SPECIFIC LANGUAGE FOR CLOUD SERVICES INFRASTRUCTURE

CROSS-REFERENCE TO RELATED APPLICATION

This application claims priority to U.S. Provisional Patent Application No. 62/079,403, filed Nov. 13, 2014; which is hereby incorporated herein by reference in its entirety.

FIELD OF THE DISCLOSURE

The invention relates to a system and method for providing and executing a domain specific programming language for cloud services infrastructure.

BACKGROUND OF THE INVENTION

A number of cloud service providers sell various cloud services to execute compute instances on behalf of their customers. For example, AMAZON sells its AMAZON WEB SERVICES (AWS) service, GOOGLE sells its GOOGLE APP ENGINE service, and others sell similar services. In exchange for a fee, AMAZON, GOOGLE, and other cloud service providers provide the use of their servers and other infrastructure to customers for a limited time in the form of a cloud service instance. The fee may vary depending on a time/date that the cloud service instance is to be run, a performance of the cloud service instance (e.g., throughput, latency, etc.), whether the offered cloud service instance is a spot instance or a standard instance, and/or other attributes.

Integrating use of cloud services into an organization's processes can be difficult. Conventionally, users can manually enter input an input into a cloud services command line interface (CLI) or graphical user interface (GUI). Making the process of creating cloud infrastructure more user friendly can be achieved through the use of specialized programs in conventional programming languages that attempt to instantiate, monitor, and update cloud instances.

SUMMARY OF THE DISCLOSURE

Accordingly, the following disclosure is related to a domain specific language for cloud services infrastructure which allows for a user to create a computing environment using a user-friendly syntax that can be converted into code that is readable by a cloud computing services provider. In one example, the user-generated code contains declarations of computing infrastructure. The declarations can be checked against a state information service that can determine if the declared infrastructure exist on the cloud service provider, and if the declared infrastructure is in scope with what is provided by the cloud service provider.

DETAILED DESCRIPTION OF THE INVENTION

Figure 1:
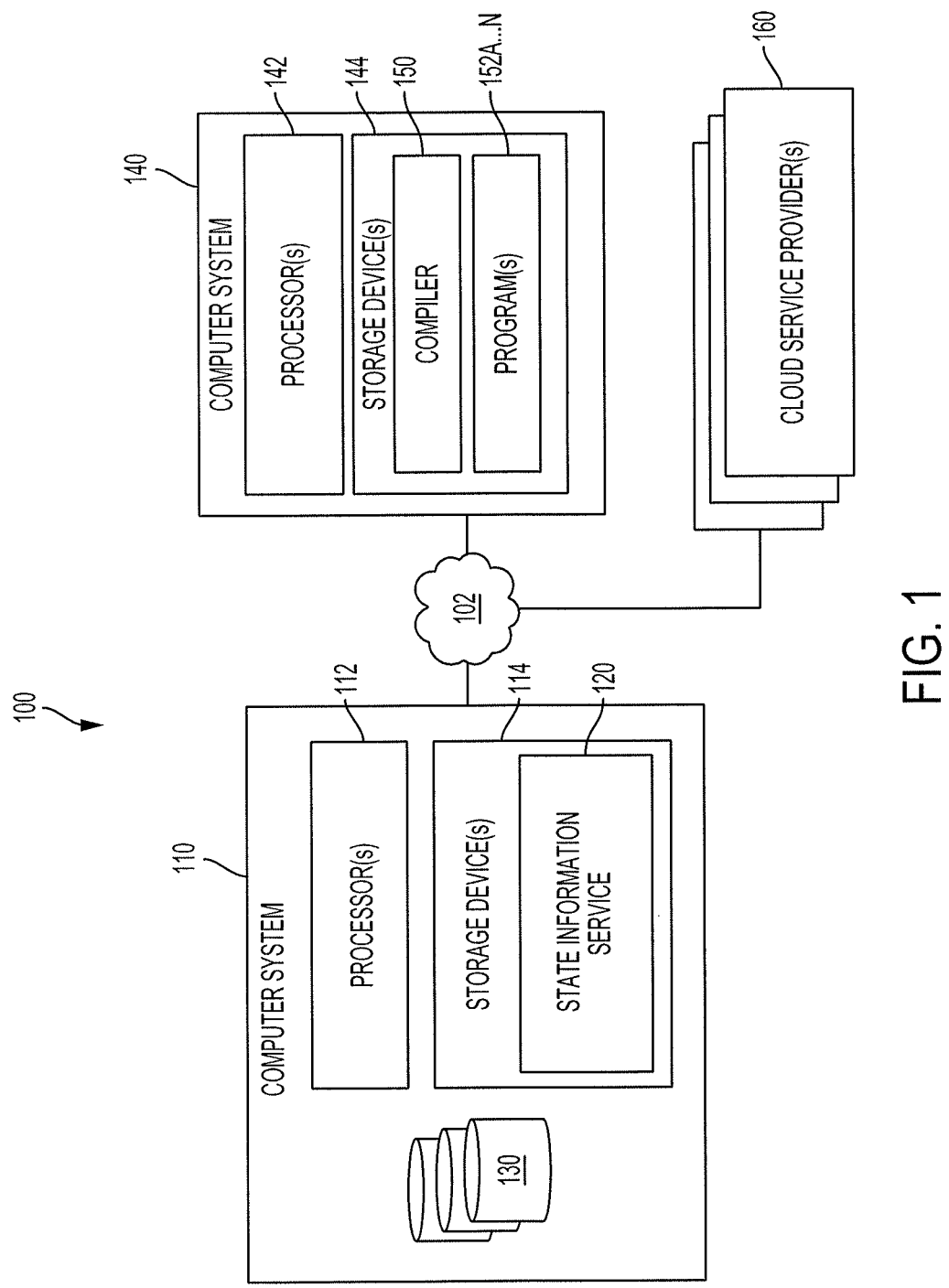
FIG. 1 depicts a system of providing and executing a domain-specific programming language for cloud services infrastructure, according to an implementation of the invention.

FIG. 1 illustrates a system 100 of providing and executing a domain-specific programming language for cloud services infrastructure (hereinafter, "domain-specific programming language" for convenience), according to an implementation of the invention. The system may be used to integrate references to external entities, such as cloud service compute instances, directly into a domain-specific programming language, allowing developers to easily integrate cloud services directly using the domain-specific programming language.

For illustration and not limitation, the external entities will be described as cloud compute instances (e.g., compute instances executed at a computer operated by a cloud service provider) that may be referenced directly within the domain-specific programming language described herein. However, other external entities (e.g., external to a given memory of a computer device that executes code that uses the domain-specific programming language described herein) may be used as well. As an example, the external entities can include DNS entries, binary objects, shared queues, database tables, etc.

The system may be used to facilitate checking against the type and state of an external entity in the language itself, including at authoring, build and run times. Furthermore, the system may facilitate compilation, type checking and debugging while authoring programs against external entities as opposed to requiring testing to be performed to find errors and bugs.

Language Primitives that are References to Infrastructure or Other External Entities Typically, in a programming language, a variable may be resolved to an address in memory at runtime. For example, if one were to define my-thing=123456, this would put the value 123456 to a location in memory. After definition, any code using my-thing would either get a reference to that memory address or would receive a copy of the value.

Using the domain-specific programming language described herein, references to external entities (not in memory) as variables may be used. For example, by defining mything=this-instance, this-instance would be resolved to a URL or other identifier of a running virtual computer, as opposed to an address in memory. This allows for checking against the type and state of an external entity in the language itself, including at authoring, build and run times. The reference may be set by another program, manual configuration (e.g., at compile time), and/or other processes. By using language primitives that are references to cloud services infrastructure, the system facilitates checking, at compile and debug time, for the legitimacy of the reference, and to have a valid reference at runtime. Computing infrastructure can refer to components within a computing system that are being provided by a cloud service rather than having to use physical on-site devices. For instance computing infrastructure can refer to computing devices such as virtual machines, load balancers, virtual networks, data storage services, domain name services, disk imagers, containers, clusters, and lambda instructions. These examples are not meant to be limiting, and are only provided as examples. The domain-specific programming language further facilitates compilation, type checking and debugging while authoring programs against external entities as opposed to requiring testing to be performed to find errors and bugs.

Lexical Scoping that Maps to Abstractions of External Entities

In typical programming languages, lexical scoping is a way to organize pieces of code such that names can be re-used and also to allow for segmentation and encapsulation of elements of the program. For example, a private field in an Object-Oriented language prevents direct access to that data from outside the instance of the Class in which it is defined.

Using the domain-specific programming language described herein, lexical scoping may be mapped onto collections of entities that aren't a native part of the language. For example, a compute instance may be defined using the reference to external entity method described above: my-thing=this-instance, where this instance is a pointer to an actual entity in the runtime environment.

Using external entity lexical scoping, the system may make this-instance a child of this venue, where this-venue may include an arbitrary collection of entities. If this-instance was not public to the scope of the calling code, the compiler would return an error when directly referencing. This may occur when, for example, the scope of a variable was limited to a particular set of entities. The external entity may be associated with a single cloud service provider or different cloud service providers, the identification of which may be associated with a given variable or reference.

Externalizing the Language Runtime State Information to a Service

In order to facilitate these and other benefits, the system may maintain state information of all references and shared variables across program boundaries. The system may make the state information accessible via a state information service that understands the language features of the domain-specific programming language.

At compile time, the compiled code can be processed by an interpreter module of the run-time environment (explained in detail below) that may query the state information service to identify a variable in scope to the use in the language in order to determine if it exists, and, if so, whether it is in scope to reference. The state information service may also deliver details on how the entity may be used, such as available functions or operations.

The state information service may keep detailed version information on the state of the variable. For example, if user A creates an entity via compiling and running a program, a corresponding variable may appear in the state information service, along with a serial number (or other version information) set to 1. In some examples, the corresponding variable can be a unique hash derived from the computing infrastructure's instance in the program. During the normal operations of the entity, its state changes (e.g., to another Internet Protocol address). A second program that initiates the change may update the table with the new IP address, and may increment the serial number to 2. When a third program references the entity, and has a version 1 understanding of the state, it sees that the new serial number is 2 and may query the state information service for the latest version.

The state information may be made generic and scoped across all the entities the organization wishes to have available. In this way, multiple users across many parts of an organization may interoperate with the products of their peers in other teams dynamically.

Other uses of system 100 are described herein and still others will be apparent to those having skill in the art. Having described a high level overview of some of the system functions, attention will now be turned to various system components that facilitate these and other functions.

The above infrastructure primitives and the lexical scoping applied to them, as discussed above, can be used to create functions that can yield patterns of infrastructure based on certain arguments inputted into those functions. The code example provided below, is an example of an enumeration type:

```
Type IcmpDescription:
    | Ping
    | DestinationUnreachable
    | RedirectMessage
```

The code example provided below, is an example of a data structure type that can define the properties of an "icmp." In the example below, the icmp type has the property values "type" and "code" and these properties are expressed as integers.

```
Type Icmp:
    | type: INT
    | code: INT
```

The code example below, illustrates an example function using the domain specific language. The example code below taken a infrastrucre description and evaluates to an icmp (machine data).

```
Icmp fromDescription(IcmpDescription icmp):
    Case icmp of
        | ping                    {code: 0, type: 0}
        | DestinationUnreachable  {code: 0, type: 3}
        | Redirect Message        {code: 0, type: 5}
```

The above functions can be evaluated at compile time by the explain function described in further detail below.

Exemplary System Architecture

System 100 may include a computer system 110, a computer system 140, one or more cloud service providers 150, and/or other components.

Computer System 110

Computer system 110 may include one or more processors 112 (also interchangeably referred to herein as processors 112, processor(s) 112, or processor 112 for convenience), one or more storage devices 114 (which may store a state information service 120, hereinafter SIS 120 for convenience), one or more entity state information databases 130, and/or other components. Processors 112 may be programmed by one or more computer program instructions. For example, processors 112 may be programmed by SIS 120 and/or other instructions.

Computer System 140

Computer system(s) 140 may each include one or more processors 142 (also interchangeably referred to herein as processors 142, processor(s) 142, or processor 142 for convenience), one or more storage devices 144 (which may store a compiler 150A, one or more programs 152, and/or other instructions), and/or other components. Processors 142 may be programmed by one or more computer program instructions. For example, processors 142 may be programmed by compiler 150, programs 152, and/or other instructions.

Cloud Service Providers 160

Cloud service providers 160 may include entities that sell various cloud services to execute compute instances on behalf of their customers. For example, AMAZON sells cloud service instances using its AMAZON WEB SERVICES (AWS) service, and GOOGLE sells cloud service instances using its GOOGLE APP ENGINE service. In other examples, cloud service providers can also include other specialized providers who provide non-compute services such as content delivery networks, domain name service, etc.

Cloud service providers 160 may also include entities that provide markets, or exchanges, for cloud services. For example, cloud service providers 160 may include markets that sell cloud service instances on behalf of others that actually provide the cloud service instances using their infrastructure. In this manner, system 100 may leverage exchanges that may sell various cloud service instances from different entities.

Although illustrated in FIG. 1 as a single component, computer system 110 and computer system 140 may each include a plurality of individual components (e.g., computer devices) each programmed with at least some of the functions described herein. In this manner, some components of computer system 110 and/or customer computer system 140 may perform some functions while other components may perform other functions, as would be appreciated. The one or more processors 112, 142 may each include one or more physical processors that are programmed by computer program instructions. The various instructions described herein are exemplary only. Other configurations and numbers of instructions may be used, so long as the processor(s) 112, 142 are programmed to perform the functions described herein.

Furthermore, it should be appreciated that although the various instructions are illustrated in FIG. 1 as being co-located within a single processing unit, in implementations in which processor(s) 112, 142 includes multiple processing units, one or more instructions may be executed remotely from the other instructions. In addition, at least some of the functions described herein with respect to processor(s) 112 may be performed by processor(s) 142, and vice versa. For example, processor(s) 112 may be programmed by compiler 150, programs 152, and/or execute a runtime environment for programs 152. Likewise, processor(s) 142 may be programmed with state information service 120.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The entity state information database 130 (and/or any other database) described herein may be, include, or interface to, for example, an Oracle™ relational database sold commercially by Oracle Corporation. The example database provided above is not meant to be limiting and the entity state information database 130 could include, or be interfaced to other databases, such as Informix™, DB2 (Database 2), Amazon DynamoDB™ or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary System Processing Operations

Figure 2:
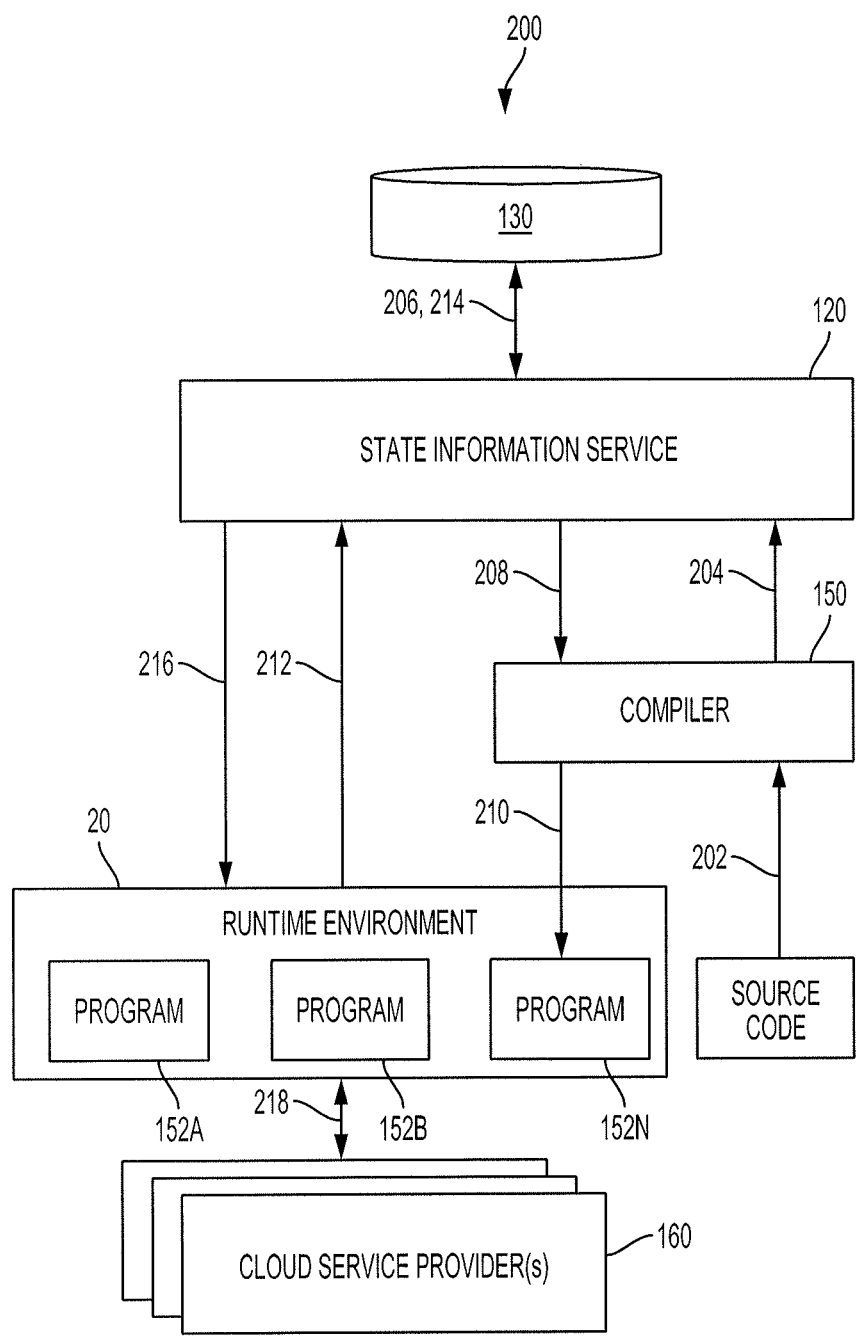
FIG. 2 depicts a process flow diagram of various system components for providing and executing a domain-specific programming language for cloud services infrastructure, according to an implementation of the invention.

FIG. 2 depicts a process flow diagram 200 of various system components for providing and executing a domain-specific programming language for cloud services infrastructure, according to an implementation of the invention. The various processing operations and/or data flows depicted in FIG. 2 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, source code in the domain-specific programming language for cloud services infrastructure may be received. For example, a developer may draft the source code to be received and compiled by compiler 150.

The compiled code generated by compiler 150 may be sent to the run-time environment 20, in which an explain action can be initiated (described further below) and a query can be sent to SIS 120 to identify a variable in scope to the use in the source code to determine whether the variable exists, and, if so, whether the variable is in scope to the reference.

In an operation 206, SIS 120 may query entity state information database 130 to obtain the state information for the variable and/or the reference.

SIS 120 may obtain and provide any relevant state information (which may indicate an existence of the variable, its scope, a reference to an external entity such as a compute instance provided by cloud service provider 150, how an entity may be used such as its available functions, etc.) to the other components in the run-time environment (or return NULL or other indication that the variable does not exist).

In an operation 210, compiler 150 may generate an executable program (hereinafter referred to as program 152A for convenience) if the variable exists and is in scope based on the state information. Program 152A may be placed run in runtime environment 20, along with other programs (152B, ..., N) that have been compiled by compiler 150. The run-time environment is discussed in detail below with respect to FIG. 3.

In an operation 212, runtime environment 20 may execute program 152B. For example, program 152E may be called to run in runtime environment 20 by a human user, a process, and/or other user. Runtime environment 20 may query SIS 120 to identify a variable in scope to the use in the program 152B to determine whether the variable exists, and, if so, whether the variable is in scope to the reference. For example, runtime environment 20 may transmit the query via network 102 to SIS 120.

In an operation 214, SIS 120 may query entity state information database 130, as described with respect to operation 206.

In an operation 216, SIS 120 may obtain and provide any relevant state information to runtime environment 20, as described before with respect to operation 208. Runtime environment may cause an error (e.g., a runtime fault) to occur if a given variable is not in scope to the calling compiled code (program 152B). Otherwise, runtime environment 20 may obtain a current state of a given variable in program 152B at the time of execution so that any state changes related to a referenced entity (e.g., compute instance executing at a cloud service provider 160) may be accounted for during execution of program 152B.

In an exemplary operation of programs in runtime environment 20, a user may compile and execute program 152A, which may include a variable that references an entity and causes the entity to be created. For example, the created entity may include, without limitation, a compute instance at cloud service provider 160. In other words, using the domain-specific language described herein, instantiation of a variable may refer to, and cause to be created, a corresponding compute instance. In an implementation, the source code for program 152A may specify/define the cloud instance to which the variable is referenced or the cloud instance may be defined by a configurable parameter setting. Upon compilation, SIS 120 may store the variable, its reference, its state, how the compute instance may be used, and/or other state information using entity state information database 130.

Program 152B may also include the variable. When program 152B is compiled, an explain action can be executed in the run-time environment (explained in further detail below) that may query SIS 120 to determine whether the variable is in-scope to program 152B. Likewise, when program 152B is run, runtime environment 20 may query SIS 120 to determine whether the variable is in-scope as well as obtain current state information related to the variable.

In some instances, program 152B may cause the variable to be updated. For example, program 152B may cause a replacement compute instance to replace the existing compute instance at cloud service provider 160, causing an addressable identifier (e.g., an Internet Protocol address) to be changed to refer to the replacement computer instance. Responsive to such change, runtime environment 20 may provide SIS 120 with the update, which may update entity state information database 130 with the updated information for the variable. In another example, changes to instances of computing infrastructure (i.e., variables) initiated by an external actor (such as a user manually operating the cloud computing environment interface can be reverted back to its original form, it is found that the altered form does not conform to the original instance of the computing instance specified by the user through the domain specific programming language.

Program 152N may also include the variable. Variables from program 152N may be validated at compile and runtime, as described above. Program 152N, when executed, may obtain the current state information related to the variable. For instance, instead of a reference to a compute instance created by program 152A (which may have cause the compute instance to be created), a variable included in program 152N may reference the current compute instance, as updated by program 152B. In this manner, different programs may update the same variable, which may cause references for those variables to be updated as well. Using the domain-specific language described herein, different developers may therefore refer to different entities (such as compute instances at cloud service providers 160) natively within the language of the code.

Figure 3:
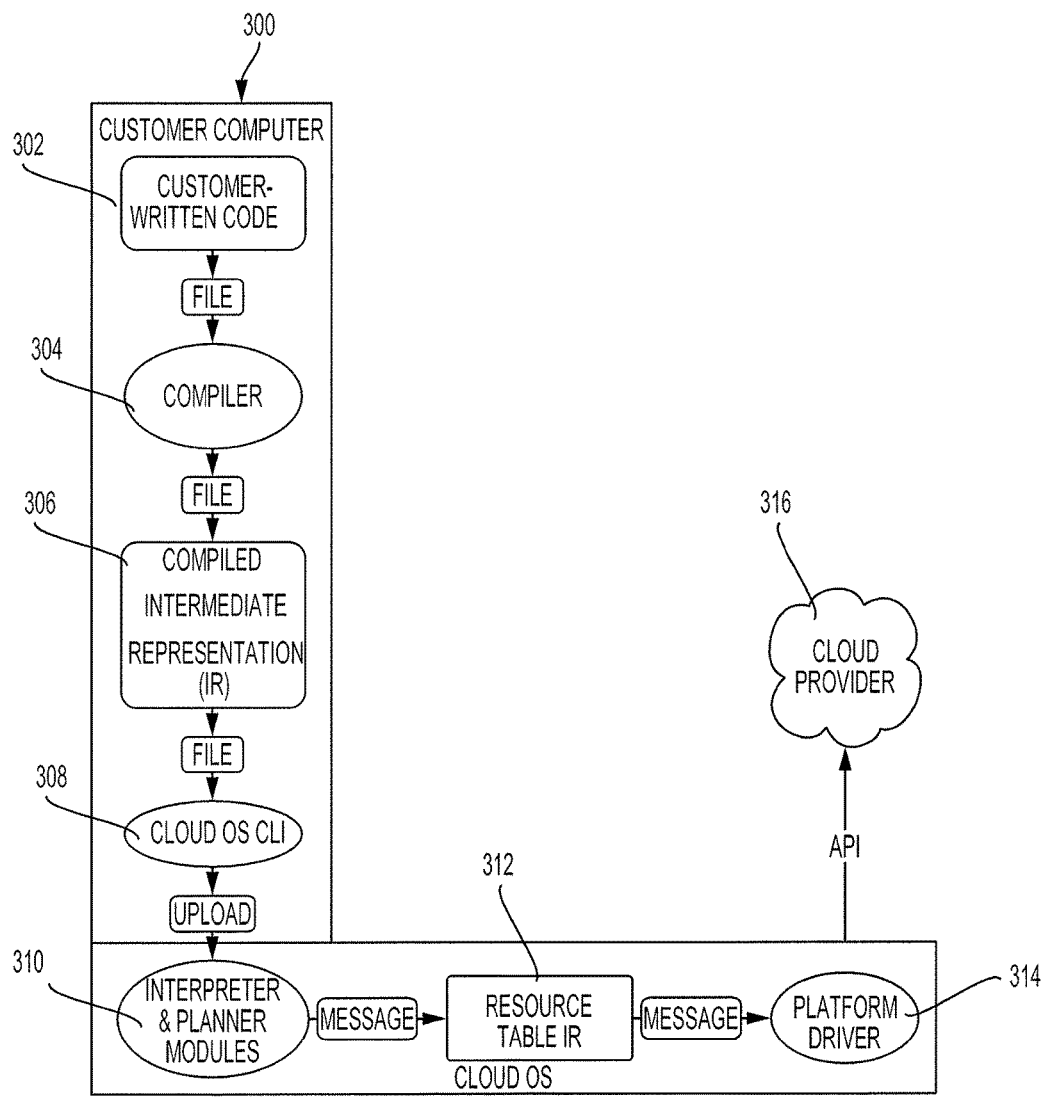
FIG. 3 illustrates an exemplary runtime environment of a compiled domain specific programming language for cloud services infrastructure, according to examples of the disclosure.

FIG. 3 illustrates an exemplary run-time environment of a compiled domain-specific programming language for cloud services infrastructure, according to examples of the disclosure. As illustrated in FIG. 3, at the customer/client computer 300, a user can compose computer code using a domain-specific programming language that specifies computing infrastructure to implement on a cloud-based computing service.

Once a user has generated the code, the code is compiled at step 304, wherein it is converted from a user-friendly syntax generated by the user into an intermediate representation (illustrated at step 306) that can be understood by the command line interface of an infrastructure operating system. At step 308, the infrastructure operating system can execute the compiled code 306 by building and tracking what the code declares.

The code can then be sent to the interpreter and planner modules 310 that convert the command line interface language (i.e., intermediate representation 306) into a series of specific instructions that can executed by the infrastructure operating system. In one example the interpreter manager can use one or more planning modules to build the instructions. The interpreter manager can achieve this by employing a series of planning modules that accept, in some examples, resource tables at its input and generates resource tables in which any omissions in the syntax provided by the user are filled in. In one example, the planning modules can receive a resource table that specifies properties of the computing infrastructure to be built. The interpreter manager can review a resource table sent by the user (in the form of compiled domain specific code and send it to the series of planning modules based on what infrastructure needs have been declared by the user.

The planning modules alter the user's resource table and return it to the interpreter manager. This process may be repeated with other planning modules until the final correct version of the resource table is complete at step 312. The interpreter manager then converts the resource table into a machine instruction file which can be referred to as a low level declaration of the computer infrastructure to be built on the cloud. The low level declaration is then sent to the builder/driver 314 wherein the resource table is converted into a language that can be interfaced with the application program interface of a cloud provider 316.

As part of its operation, the interpreter and planner modules 310 can input the user declared instances of computing infrastructure, as well as the scope of those declared instances, generated by the user in the domain specific computing language. The interpreter can query an external state information service database (discussed above) to determine if the type of computing instance declared by the user exists, and if so, the state information service can provide any relevant state information to the interpreter.

Once the computing infrastructure has been built on the cloud computing environment, the implemented infrastructure can be "persisted" which means that the implemented infrastructure can be compared against the user's originally declared instance of the computing infrastructure as expressed in the domain-specific programming language. If any differences are found, the implementation of the computing infrastructure can be modified by the interpreter 310, so that the implementation of the infrastructure on the cloud matches the user's desired infrastructure.

Figure 4:
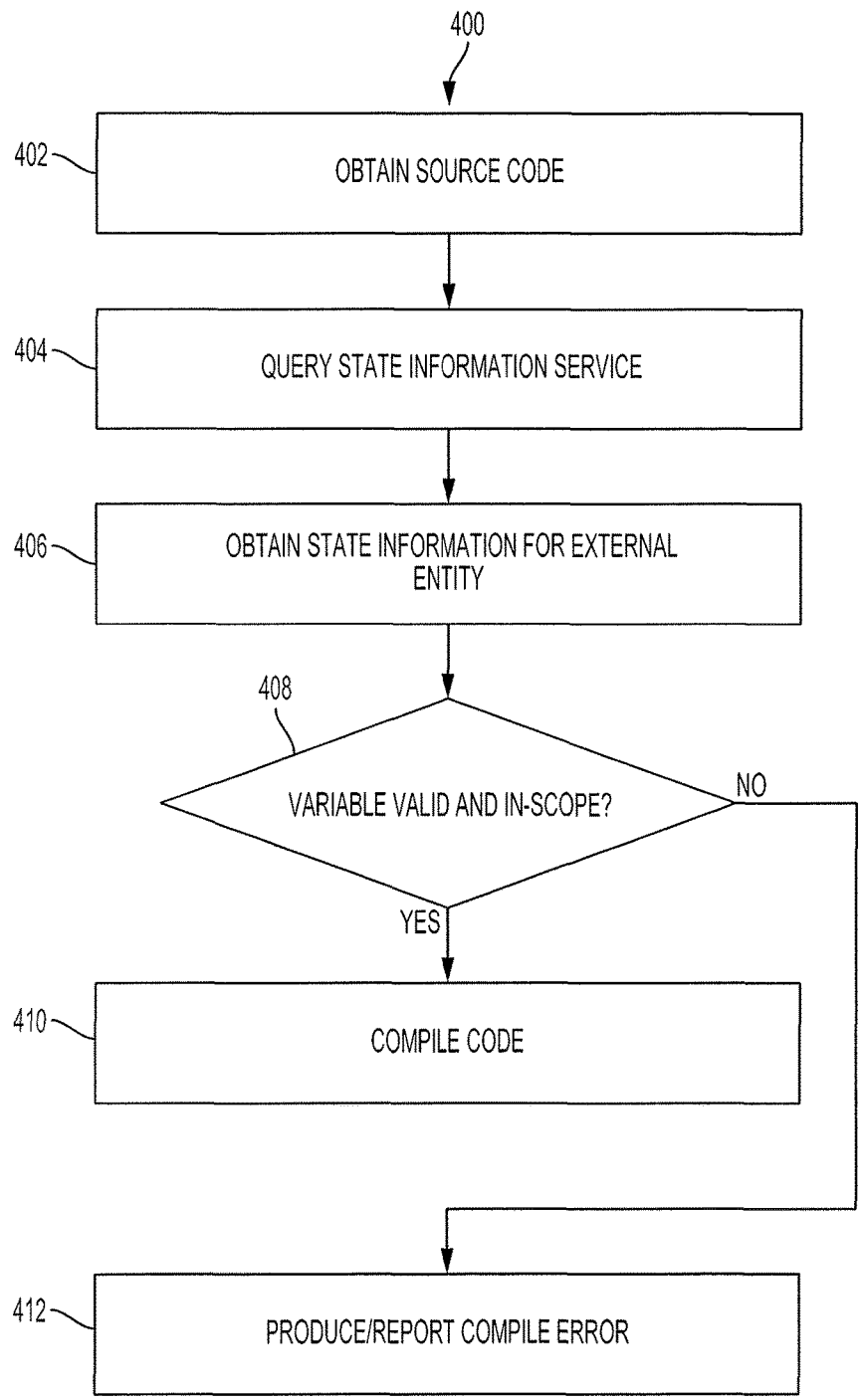
FIG. 4 illustrates a process of compiling a domain-specific programming language for cloud services infrastructure, according to an implementation of the invention.

FIG. 4 illustrates a process 400 of compiling a domain-specific programming language for cloud services infrastructure, according to an implementation of the invention. The various processing operations and/or data flows depicted in FIG. 4 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, source code in a domain-specific programming language may be obtained.

In an operation 404, a state information service may be queried to identify a variable in scope to the use in the language in order to determine if it exists, and, if so, whether it is in scope to reference. Operation 404 may be repeated, as necessary, for variables that appear in the source code. As discussed above, the state information service may be queried during an explain action (explained in detail below) in which an interpreter located in the run-time environment can query the state information service to determine if the variable exists, and if so, whether it is in scope to how it is referenced in the user generated code.

In an operation 406, state information: may be obtained based on the query.

In an operation 408, a determination of whether a variable exists and/or is in scope may be determined.

In an operation 410, responsive to a determination that the variable exists and is in scope, the source code may be transmitted to the run-time environment for implementation on the cloud service.

In an operation 412, responsive to a determination that the variable does not exist or is not in scope, a compile error may occur and be communicated.

Figure 5:
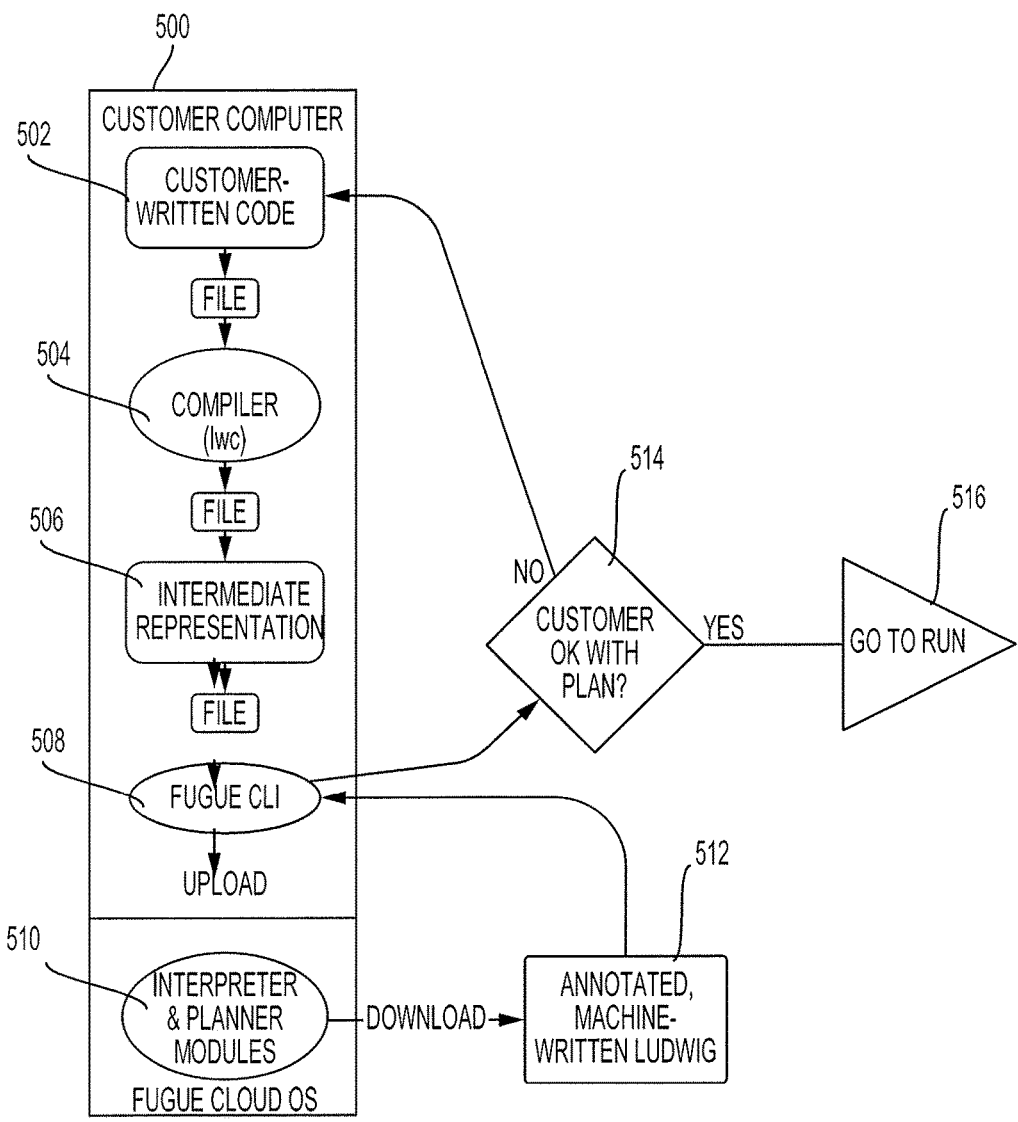
FIG. 5 illustrates an exemplary explain process according to examples of the disclosure.

FIG. 5 illustrates an exemplary explain process according to examples of the disclosure. In the explain action illustrated in FIG. 5, steps 502, 504, 506, 508, and 510 operate in substantially the same way as their counterparts in FIG. 3 (i.e., steps 302, 304, 306, 308, and 310 respectively). However, in contrast to the process illustrated in FIG. 3, rather than converting the resource table generated by the interpreter into a machine instruction file, instead at step 512 the process returns the annotated resource table to the infrastructure operating system CLI 508.

As discussed above, as part of its operation, the interpreter can input the user declared instances of computing infrastructure, and query a state information service database to determine if they exist. If it is determined that the instance of computing infrastructure does not exist, then the state information service can indicate to the interpreter that the declared instance does not exist and the use can be notified at step 512.

If however all the declared variables exist, the user can be presented with a plan for how the infrastructure is to be implemented at step 514. At step 514 the user can determine if the received implementation plan is acceptable, and if so, the process can move to step 516 wherein the annotated coded produced at step 512 is converted into machine code that is compatible with the command line interface of a cloud computing services provider.

Figure 6:
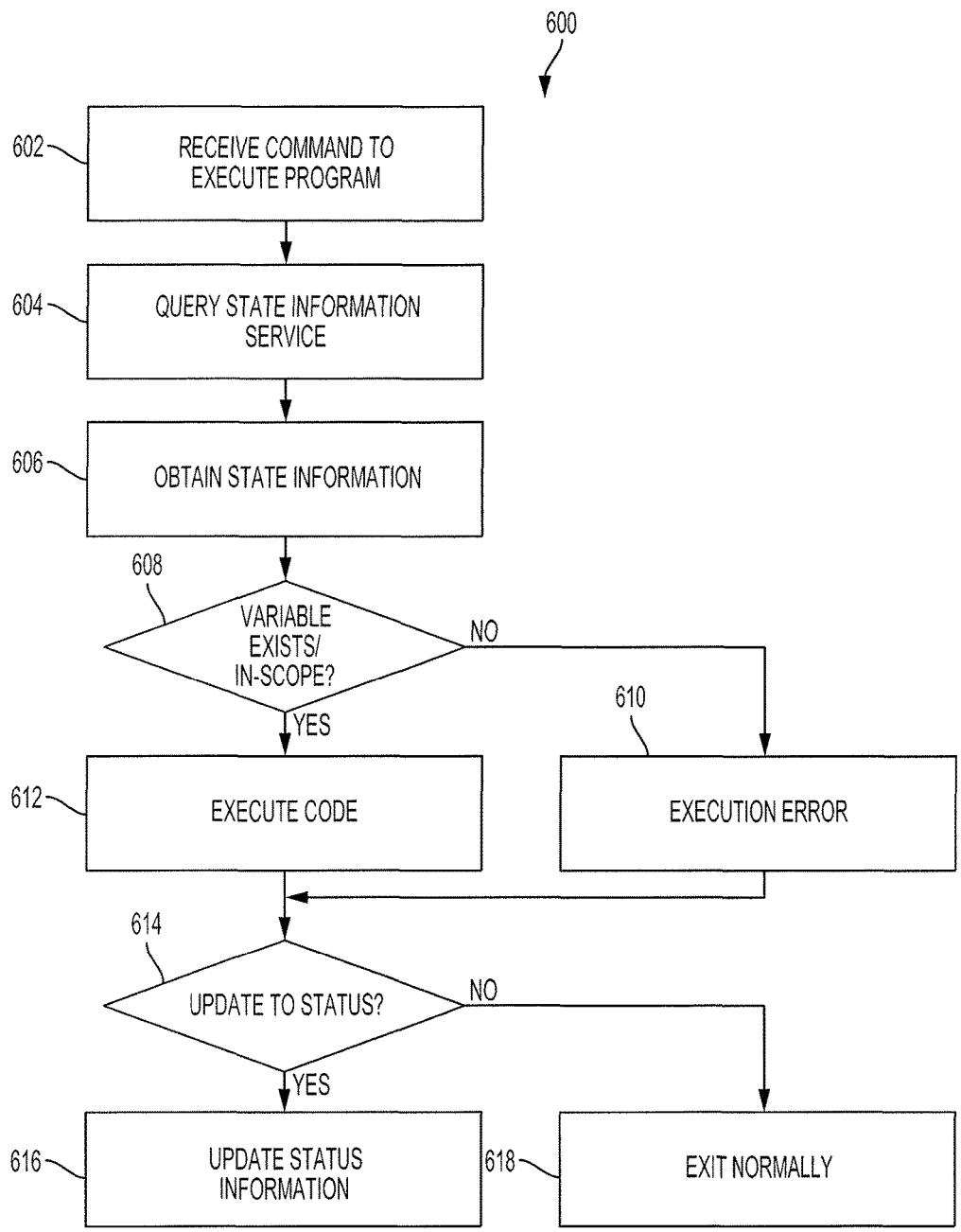
FIG. 6 illustrates a process of executing a domain-specific programming language for cloud services infrastructure, according to an implementation of the invention.

FIG. 6 illustrates a process 600 of executing a domain-specific programming language for cloud services infrastructure, according to an implementation of the invention. The various processing operations and/or data flows depicted in FIG. 6 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, a command to execute a program compiled from source code using the domain-specific programming language may be received.

In an operation 604, a state information service may be queried to identify a variable in scope to the use in the language in order to determine if it exists, and, if so, whether it is in scope to reference. Operation 604 may be repeated, as necessary, for variables that appear in the source code.

In an operation 606, state information may be obtained based on the query.

In an operation 608, a determination of whether a variable exists and/or is in scope may be determined.

In an operation 610, responsive to a determination that the variable does not exist or is not in scope, a runtime error may occur and be communicated.

In an operation 612, responsive to a determination that the variable exists and is in scope, the program may be executed. Operation 612 may be repeated until all variables have been processed. In some implementations, execution of the code may cause a compute instance at a cloud service provider to be instantiated. In these implementations, state information (e.g., IP address, version, how used, etc.) may be stored via a state information service. In this manner, other programs that use the same variable may access the state information for the instantiated compute instance.

In an operation 614, a determination of whether an update to state information of an entity associated with a variable occurred during execution of the program may be made. For example, a program that uses a variable corresponding to a compute instance may have changed an IP address associated with the compute instance. Operation 614 may be repeated until all variables have been processed.

Responsive to a determination that an update occurred, in an operation 416, the state information may be updated via a state information service.

In an operation 618, code execution may terminate normally (e.g., without error conditions).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Therefore, according to the above, some examples of the disclosure are directed to A method for building infrastructure on a cloud computing system, the method comprising: receiving source code written by a user in a domain-specific programming language, wherein the source code contains one more variables that define one or more instances of computing infrastructure to be built in a cloud computing environment, querying a state information service to identify whether the one or more instances of computing infrastructure exist in the state information service and to identify whether the one or more variables are in scope with the identified one or more instances of computing infrastructure and converting the received source code into one or more instructions readable by a command line interface of the cloud computing environment if the one or more instances of computing infrastructure are found to exist and are in scope with the identified one or more instances of computing infrastructure. Additionally or alternatively to one or more of the examples disclosed above, in some examples receiving source code written in a domain-specific programming language includes converting the source-code into an intermediate representation that is compatible with a command line interface of a cloud infrastructure operating system. Additionally or alternatively to one or more of the examples disclosed above, in some examples the method further comprises generating an implementation plan if each variable of the one or more variables is found to exist in the state information service and be in scope with the identified one or more instances of computing infrastructure. Additionally or alternatively to one or more of the examples disclosed above, in some examples the method further comprises transmitting the generated implementation plan to the user for approval. Additionally or alternatively to one or more of the examples disclosed above, in some examples the method further comprises implementing the source code written by the user in the domain-specific programming language on the cloud computing environment if the user approves of the generated implementation plan. Additionally or alternatively to one or more of the examples disclosed above, in some examples implementing the source code includes converting the source-code into an intermediate representation that is compatible with a command line interface of a cloud infrastructure operating system. Additionally or alternatively to one or more of the examples disclosed above, in some examples implementing the source code includes modifying the one or more instructions readable by a command line interface of the cloud computing environment such that an implemented one or more instances of computing infrastructure corresponds to the source code. Additionally or alternatively to one or more of the examples disclosed above, in some examples the source code includes one or more functions that utilize the one or more variables associated with the one or more instances of computing infrastructure to be built on a cloud computing environment. Additionally or alternatively to one or more of the examples disclosed above, in some examples the one or more variables include user defined instances of computing infrastructure to be built on the cloud computing environment.

Some examples of the disclosure are directed to a method for building infrastructure on a cloud computing system, the method comprising: receiving source code written by a user in a domain-specific programming language, wherein the source code contains one more variables that define one or more instances of computing infrastructure to be built on a cloud computing environment, querying a state information service to identify whether the one or more instances of computing infrastructure exist in the state information service and to identify whether the one or more variables are in scope with the identified one or more instances of computing infrastructure, and notifying the user, if any of the one or more variables do not exist in the state information service or if any of the one or more variables are found to not be in scope with the identified one or more instances of computing infrastructure. Additionally or alternatively to one or more of the examples disclosed above, in some examples, receiving source code written in a domain-specific programming language includes converting the source-code into an intermediate representation that is compatible with a command line interface of a cloud infrastructure operating system.

Some examples of the disclosure are directed to a non-transitory computer readable storage medium storing one or more programs, the one or more programs comprising instructions building infrastructure on a cloud computing system, which when executed by a portable electronic device, cause the device to, receive source code written by a user in a domain-specific programming language, wherein the source code contains one more variables that define one or more instances of computing infrastructure to be built in a cloud computing environment, query a state information service to identify whether the one or more instances of computing infrastructure exist in the state information service and to identify whether the one or more variables are in scope with the identified one or more instances of computing infrastructure, and convert the received source code into one or more instructions readable by a command line interface of the cloud computing environment if the one or more instances of computing infrastructure are found to exist and are in scope with the identified one or more instances of computing infrastructure. Additionally or alternatively to one or more of the examples disclosed above, receiving source code written in a domain-specific programming language includes converting the source-code into an intermediate representation that is compatible with a command line interface of a cloud infrastructure operating system. Additionally or alternatively to one or more of the examples disclosed above, the processor is further cause to generate an implementation plan if each variable of the one or more variables is found to exist in the state information service and be in scope with the identified one or more instances of computing infrastructure. Additionally or alternatively to one or more of the examples disclosed above, the processor is further is caused to transmit the generated implementation plan to the user for approval. Additionally or alternatively to one or more of the examples disclosed above, the processor is further caused to implement the source code written by the user in the domain-specific programming language on the cloud computing environment if the user approves of the generated implementation plan. Additionally or alternatively to one or more of the examples disclosed above, implementing the source code includes converting the source-code into an intermediate representation that is compatible with a command line interface of a cloud infrastructure operating system. Additionally or alternatively to one or more of the examples disclosed above, implementing the source code includes modifying the one or more instructions readable by a command line interface of the cloud computing environment such that an implemented one or more instances of computing infrastructure corresponds to the source code. Additionally or alternatively to one or more of the examples disclosed above, the source code includes one or more functions that utilize the one or more variables associated with the one or more instances of computing infrastructure to be built on a cloud computing environment. Additionally or alternatively to one or more of the examples disclosed above, the one or more variables include user defined instances of computing infrastructure to be built on the cloud computing environment.

Some examples of the disclosure are directed to a non-transitory computer readable storage medium having stored thereon a set of instructions that when executed by a computing device, cause the computing device to: receive source code written by a user in a domain-specific programming language, wherein the source code contains one more variables that define one or more instances of computing infrastructure to be built on a cloud computing environment, query a state information service to identify whether the one or more instances of computing infrastructure exist in the state information service and to identify whether the one or more variables are in scope with the identified one or more instances of computing infrastructure, and notify the user, if any of the one or more variables do not exist in the state information service or if any of the one or more variables are found to not be in scope with the identified one or more instances of computing infrastructure. Additionally or alternatively to one or more of the examples disclosed above, receiving source code written in a domain-specific programming language includes converting the source-code into an intermediate representation that is compatible with a command line interface of a cloud infrastructure operating system.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for building a computing infrastructure on a cloud computing system, the method comprising:
    receiving, by a runtime environment of a cloud infrastructure operating system, a source code written by a user in a domain-specific programming language, wherein the source code contains one or more variables that define one or more instances of the computing infrastructure to be built on the cloud computing system, wherein the source code includes one or more functions that utilize the one or more variables associated with the one or more instances of the computing infrastructure to be built on the cloud computing system;
    sending, by the runtime environment of the cloud infrastructure operating system, a query to a state information service to identify whether the one or more instances of the computing infrastructure exist in the state information service and to identify whether the one or more variables are in scope with the identified one or more instances of the computing infrastructure;
    receiving, in response to the query, a state information from the state information service indicating that the one or more instances of the computing infrastructure exist and the one or more variables are in scope with the identified one or more instances of the computing infrastructure to be built on the cloud computing system; and
    converting, by the runtime environment of the cloud infrastructure operating system in response to receiving the state information, the source code into one or more instructions that are compatible with an application program interface of the cloud computing system and are executable by the cloud computing system to build the computing infrastructure on the cloud computing system.

2. The method of claim 1 further comprising generating an implementation plan if each variable of the one or more variables is found to exist in the state information service and to be in scope with the identified one or more instances of the computing infrastructure.

3. The method of claim 2, further comprising transmitting the generated implementation plan to the user for approval.

4. The method of claim 3, further comprising implementing the source code written by the user in the domain-specific programming language on the cloud computing system if the user approves the generated implementation plan.

5. The method of claim 4, wherein the implementing the source code includes converting the source-code into an intermediate representation that is compatible with a command line interface of the cloud infrastructure operating system.

6. The method of claim 5, wherein the implementing the source code includes modifying the one or more instructions readable by the command line interface of the cloud computing system such that an implemented one or more instances of computing infrastructure corresponds to the source code.

7. The method of claim 1, wherein the one or more variables include user defined instances of the computing infrastructure to be built on the cloud computing system.

8. A non-transitory computer readable storage medium storing one or more programs, the one or more programs comprising instructions building a computing infrastructure on a cloud computing system, which when executed by a portable electronic device, cause the portable electronic device to:
    receive, by a runtime environment of the cloud infrastructure operating system, a source code written by a user in a domain-specific programming language, wherein the source code contains one more variables that define one or more instances of the computing infrastructure to be built on a cloud computing system, wherein the source code includes one or more functions that utilize the one or more variables associated with the one or more instances of the computing infrastructure to be built on the cloud computing system;

send, by the runtime environment of the cloud infrastructure operating system, a query to a state information service to identify whether the one or more instances of the computing infrastructure exist in the state information service and to identify whether the one or more variables are in scope with the identified one or more instances of the computing infrastructure;

receive, in response to the query, a state information from the state information service indicating that the one or more instances of the computing infrastructure exist and the one or more variables are in scope with the identified one or more instances of the computing infrastructure to be built on the cloud computing system; and convert, in response to receiving the state information, the source code into one or more instructions that are compatible with an application program interface of the cloud computing system and are executable by the cloud computing system to build the computing infrastructure on the cloud computing system.

9. The non-transitory computer readable medium of claim 8, wherein the portable electronic device is further caused to generate an implementation plan if each variable of the one or more variables is found to exist in the state information service and to be in scope with the identified one or more instances of computing infrastructure.

10. The non-transitory computer readable medium of claim 9, wherein the portable electronic device is further is caused to transmit the generated implementation plan to the user for approval.

11. The non-transitory computer readable medium of claim 10, wherein the portable electronic device is further caused to implement the source code written by the user in the domain-specific programming language on the cloud computing system if the user approves the generated implementation plan.

12. The non-transitory computer readable medium of claim 11, wherein implementing the source code includes converting the source-code into an intermediate representation that is compatible with the command line interface of the cloud infrastructure operating system.

13. The non-transitory computer readable medium of claim 12, wherein the implementing the source code includes modifying the one or more instructions readable by a command line interface of the cloud computing system such that an implemented one or more instances of computing infrastructure corresponds to the source code.

14. The non-transitory computer readable medium of claim 8, wherein the one or more variables include user defined instances of the computing infrastructure to be built on the cloud computing system.

* * * * *